United States Patent
Mikulla

(10) Patent No.: US 8,074,920 B2
(45) Date of Patent: Dec. 13, 2011

(54) HELICOPTER HAVING MEANS FOR THE AERODYNAMIC SUPPORT OF THE TORQUE EQUALIZATION

(75) Inventor: Volker Mikulla, Oberpframmern (DE)

(73) Assignee: Eurocopter Deutschland GmbH, Donauworth (DE)

( * ) Notice: Subject to any disclaimer, the term of this patent is extended or adjusted under 35 U.S.C. 154(b) by 367 days.

(21) Appl. No.: 12/405,615

(22) Filed: Mar. 17, 2009

(65) Prior Publication Data

US 2009/0277991 A1    Nov. 12, 2009

(30) Foreign Application Priority Data

Mar. 19, 2008  (DE) .......................... 10 2008 015 073

(51) Int. Cl.
*B64C 27/82* (2006.01)
(52) U.S. Cl. .................................................. 244/17.19
(58) Field of Classification Search ............... 244/17.11, 244/17.19, 17.21, 45 R
See application file for complete search history.

(56) References Cited

U.S. PATENT DOCUMENTS

| 4,227,665 | A | * | 10/1980 | Carlson et al. | ................ 244/210 |
| 4,585,391 | A | | 4/1986 | Vuillet | |
| 4,708,305 | A | * | 11/1987 | Kelley et al. | ................ 244/17.19 |
| 5,209,430 | A | * | 5/1993 | Wilson et al. | ................ 244/17.19 |
| 6,352,220 | B1 | | 3/2002 | Banks | |

FOREIGN PATENT DOCUMENTS

| DE | 9012671 | 11/1990 |
| DE | 69201690 | 9/1995 |

* cited by examiner

*Primary Examiner* — Timothy D Collins
*Assistant Examiner* — Nicholas McFall
(74) *Attorney, Agent, or Firm* — Brooks Kushman P.C.

(57) ABSTRACT

A helicopter has at least one main rotor (2) situated on an airframe (1), on which a tail rotor (4) is additionally attached spaced apart from the airframe (1) via a tail boom (3) for torque equalization. The tail boom (3) is provided with elements for the aerodynamic support of the torque equalization, which include at least one auxiliary wing (5a, 5b), extending along the tail boom (3) on the side facing away from the main rotor rotational direction, for flow acceleration of the exhaust air of the main rotor (2) passing this area.

12 Claims, 2 Drawing Sheets

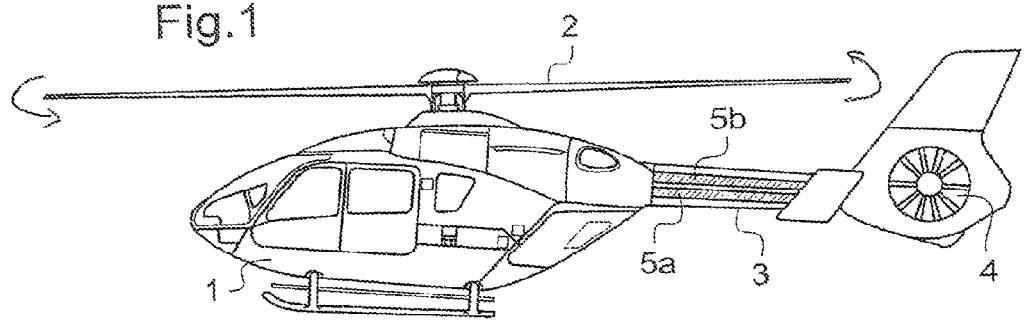
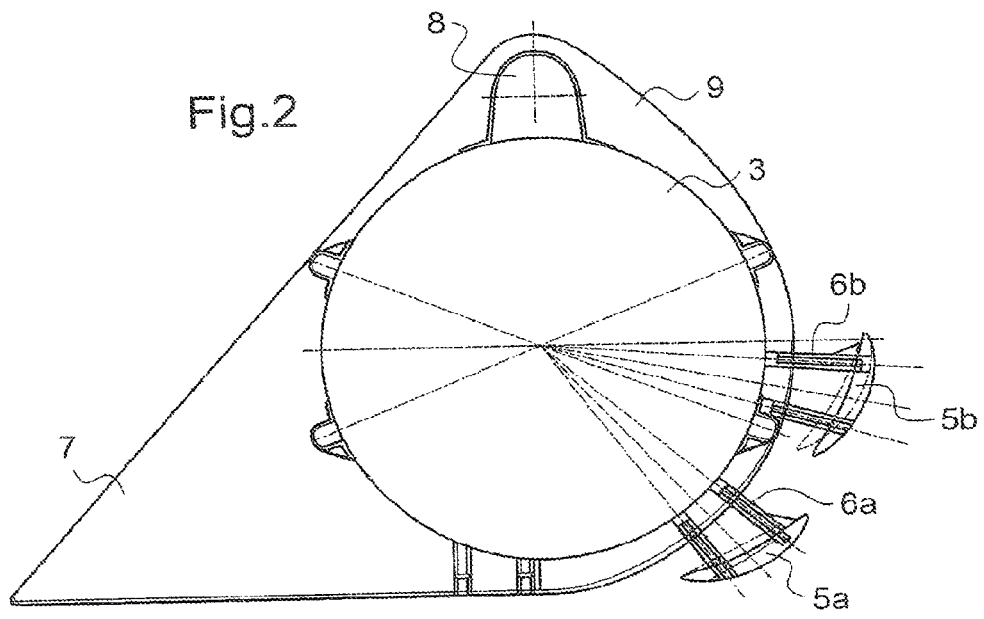

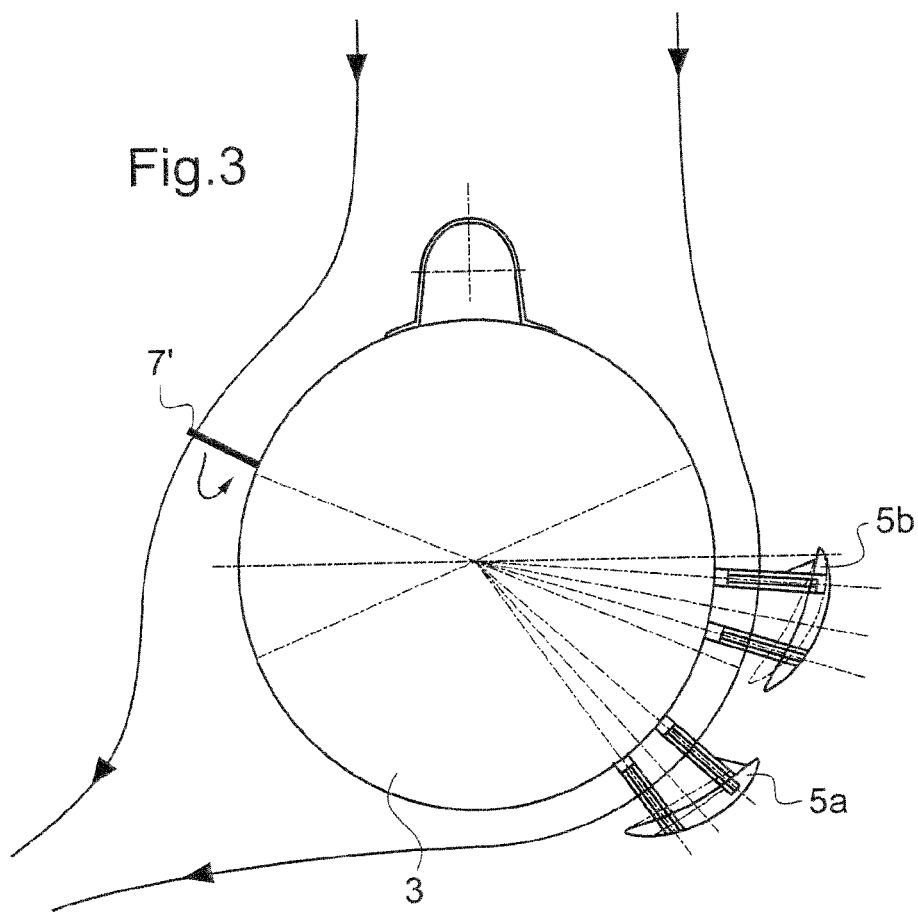
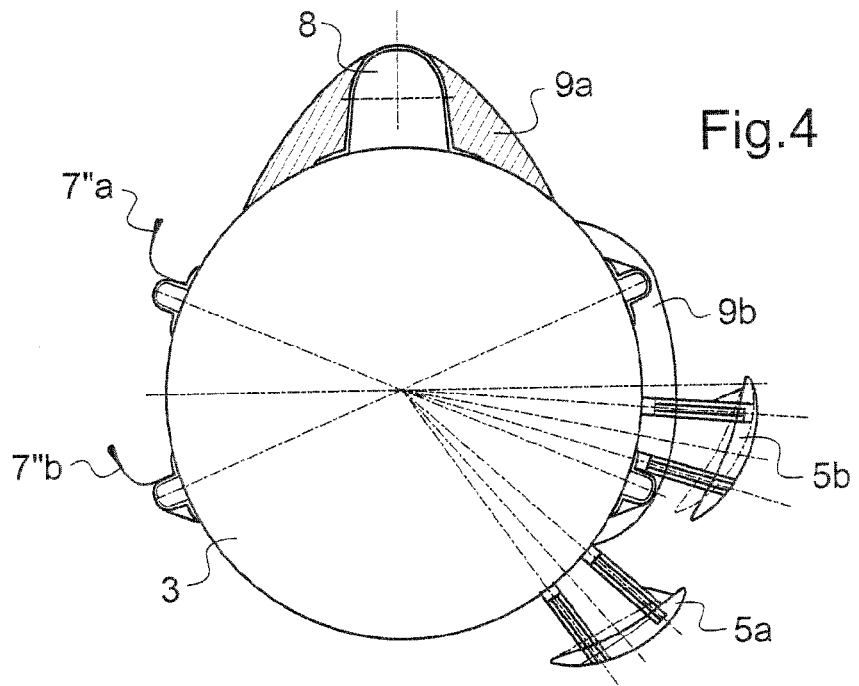

HELICOPTER HAVING MEANS FOR THE AERODYNAMIC SUPPORT OF THE TORQUE EQUALIZATION

The present invention relates to a helicopter having at least one main rotor situated on an airframe, on which a tail rotor is additionally attached at a distance to the airframe via a tail boom for torque equalization, the tail boom being provided with means for aerodynamic support of the torque equalization.

The field of use of the present invention extends to helicopters of the construction having main and tail rotors. The energy for lifting off from the ground and for the propulsion of the helicopter is typically generated via a main rotor in this case. In order that the typically manned airframe, in which the drive of the main rotor is also housed, remains rotationally-stable in relation thereto, i.e., does not also rotate, the airframe of the helicopter of the type of interest here has a tail boom, having a tail rotor, which is situated spaced apart from the airframe and thus also from the rotational axis of the main rotor, having a rotational axis offset approximately 90° transversely to the rotational axis of the main rotor. The tail rotor applies a force which causes the desired torque equalization in connection with the tail boom acting as a lever arm. In the context of the present invention, the tail rotor may either be implemented as exposed or also as a Fenestron®, i.e., as an encapsulated tail rotor.

A helicopter according to the species is disclosed in U.S. Pat. No. 4,585,391, on whose tail boom a Fenestron® is situated. It comprises multiple individual wings, some of which are connected fixed to the rotational axis and others of which are connected to the rotational axis so they are pivotable in such a way that the drive energy for the torque equalization is controllable as needed via an adjustment of the attack angle. The tail boom carrying this Fenestron® has an essentially round cross-section. During flight, the exhaust wind of the main rotor flows against the tail boom and undesired vibrations arise, which are introduced into the helicopter via the tail boom. Furthermore, the tail rotor consumes a significant part of the drive energy to fulfill its stabilization function for the helicopter.

According to the general prior art, attempts have already been made to reduce the power consumption of the tail rotor by spoilers fastened on the tail boom. The spoilers are attached laterally on the tail boom and deflect the exhaust wind generated by the main rotor approximately in the opposite rotational direction to the main rotor, so that in this way the action of the tail rotor for torque equalization is supported. However, spoilers of this type have quite large constructions, if a noticeable efficiency is to be achieved by them. Experiments have shown that even large-dimensioned spoilers only produce a savings of drive energy of the tail rotor of 1% to 4% in hover flight.

It is therefore the object of the present invention to further improve a helicopter of the type according to the species so that using compact technical means on the tail boom, the torque equalization of the tail rotor is supported with greater effectiveness, to save a significant amount of the drive energy.

The object is achieved proceeding from a helicopter according to the preamble of claim 1 in connection with its characterizing features. The following dependent claims list advantageous refinements of the invention.

The invention includes the technical teaching that the means for the aerodynamic support of the torque equalization comprise at least one auxiliary wing extending along the tail boom on the side facing away from the main rotor rotational direction for flow acceleration of the exhaust air of the main rotor passing this area.

The advantage of the solution according to the invention results from an effective deflection of the exhaust wind from the main rotor hereby generated with simultaneous flow acceleration approximately in the action direction of the tail rotor. The aerodynamic auxiliary wings according to the object of the invention may be fastened easily and compactly close to the surface of the tail boom. The auxiliary wings may be manufactured from a light material, which does not significantly increase the total weight of the helicopter. A positive secondary effect of the solution according to the invention is that because of the flow acceleration in the area of the auxiliary wings, the vibration tendency of the tail boom is reduced.

The at least one auxiliary wing is preferably to have an aerodynamic wing profile. In this way, the flow acceleration to be caused by the invention may be easily achieved. In a further embodiment, precisely two auxiliary wings lying one behind another in the flow direction are provided. In this case, the exhaust air first passes a first auxiliary wing proximal to the main rotor for the purpose of bundling the main rotor exhaust wind and accelerating it in a first stage. The exhaust air already accelerated then passes the second auxiliary wing lying behind, to achieve a still higher acceleration. Experiments have shown that two auxiliary wings working in this way and extending laterally along the boom are optimal in regard to effectiveness and installation capability on the available space on typical tail booms. Of course, situating more than two auxiliary wings accordingly, if the installation space conditions permit it, is also conceivable.

According to a measure which improves the invention, it is suggested that the at least one auxiliary wing be attached spaced apart from the surface of the tail boom via fastening struts. The fastening struts may be rod-shaped components comprising metal, which are fastened via rivets or screws both on the side of the auxiliary wing and also on the side of the boom.

The fastening struts are dimensioned in their length in such a way that the desired aerodynamic flow action is achieved.

The tail boom is ideally to be tubular and have a round to oval main cross-section. With this shaping, the auxiliary wings according to the object of the invention for supporting the torque equalization may be attached to the cross-sectional shape without further modifications. However, if the tail boom does not have such preferred smooth and flow-promoting cross-sections, but rather reinforcement profiles run over the surface of the tail boom—for example, in older models—they are to be provided with aerodynamic covers according to another measure which improves the invention, in order to provide the tail boom with an improved aerodynamic profile. The solution according to the invention is thus also suitable for retrofitting older helicopter models.

Optionally, according to another measure which improves the invention, the means for aerodynamic support of the torque equalization may furthermore also be supplemented by at least one spoiler, which extends along the tail boom on the side facing toward the main rotor rotational direction, for flow deceleration of the exhaust air of the main rotor passing this area. Deceleration of the flow of the spoiler of this type on one side of the tail boom and simultaneous acceleration of the flow as strongly as possible on the other, opposite side of the tail boom result overall in a still higher pressure difference and thus in a correspondingly higher lateral force for supporting the torque equalization.

A spoiler of this type may have a wedge-shaped cross-section and be attached directly on the surface of the tail boom according to a first preferred embodiment.

Alternatively thereto, according to a second embodiment, the spoiler may also be implemented as a baffle extending linearly outward from the surface of the tail boom. This alternative embodiment has the advantage of a lower manufacturing outlay than the first-mentioned embodiment. It is therefore to be ensured that the spoiler is attached below the impact of the adjacent exhaust gas jet so as not to obstruct its flow direction. A spoiler implemented as a baffle may additionally be implemented quite compactly.

According to a third preferred embodiment, the spoiler implemented as a baffle may also be modified in such a way that it comprises multiple areas, namely a linear area extending outward from the surface of the tail boom, which is followed by a second area extending in the direction of the main rotor. Such a spoiler may be produced by bending a baffle in a way which is simple to manufacture. Baffles of the two above-mentioned embodiments may be fastened by screws or rivets on the tail boom in a simple way, for example.

Further measures which improve the invention are explained in greater detail hereafter with the description of preferred exemplary embodiments of the invention on the basis of the figures. In the figures:

FIG. 1 shows a side view of a helicopter of the type of interest here having main rotor and tail rotor, FIG. 2 shows a schematic cross-section through a tail boom of the helicopter having means for the aerodynamic support of the torque equalization in a first embodiment, FIG. 3 shows a schematic cross-section through a tail boom of the helicopter having means for the aerodynamic support of the torque equalization in a second embodiment, and FIG. 4 shows a schematic cross-section through a tail boom of the helicopter having means for the aerodynamic support of the torque equalization in a third embodiment.

According to FIG. 1, a helicopter of interest here essentially comprises an airframe 1 for accommodating individuals to be transported and for the drive and control technology and a main rotor 2, attached thereon so it is rotatable. Furthermore, a tail boom 3 extends originating from the airframe 1, on whose distal end a tail rotor 4 is attached. The tail rotor 4 is implemented here according to the construction of a Fenestron® and generates a force opposite to the rotational direction of the main rotor 2, which provides a torque equalization to the main rotor 2 by working together with the lever arm of the tail boom 3, to keep the airframe 1 fixed in place in relation to the main rotor 2.

This torque equalization using the tail rotor 4 is supplemented by means for aerodynamic support. According to the invention, in this exemplary embodiment these means comprise two auxiliary wings 5a and 5b, which are attached on the side of the tail boom 3 facing away from the main rotor rotational direction. The two auxiliary wings 5a and 5b extend approximately over the entire length of the tail boom 3.

According to FIG. 2, the tail boom 3 has a round main cross-section and is implemented as tubular. The two auxiliary wings 5a and 5b are attached spaced apart from the surface of the tail boom 3 via fastening struts 6a and 6b. The attachment is performed in such a way that a flow acceleration of the exhaust air passing this area from the main rotor 2 (not shown in greater detail) arises. For this purpose, the two auxiliary wings 5a and 5b have an aerodynamic wing profile and the flank side of the auxiliary wings 5a and 5b against which the air flows is spaced apart relatively further from the surface of the tail boom 3 than the outflow-side lateral flank.

The two auxiliary wings 5a and 5b are situated one behind another, in that the first auxiliary wing 5b proximal to the main rotor accelerates the passing exhaust air of the main rotor 2 in a first stage, which the following second auxiliary wing 5a accelerates further in a second stage. In addition, by the positioning of the auxiliary wings 5a and 5b on the tail boom 3, a deflection of the main rotor exhaust wind in the action direction of the tail rotor 4 (not shown here) also occurs, to cause the desired additional aerodynamic support of the torque equalization.

In addition, the tail boom 3 is equipped with a spoiler 7 extending on the side facing toward the main rotor rotational direction, which causes a flow deceleration of the main rotor exhaust wind. A supplementary aerodynamic support of the torque equalization is achieved hereby. The spoiler 7 has an approximately wedge-shaped cross-section in the embodiment described here, to fulfill the intended function, and is attached directly on the surface of the tail boom 3.

To provide the tail boom 3, over whose surface flow-obstructing reinforcement profiles 8 run (for example), with a flow-promoting design, these reinforcement profiles 8 are provided with aerodynamic covers 9, which are a component of the spoiler 7 in this embodiment.

According to the embodiment shown in FIG. 3, the spoiler 7' on the tail boom 3 comprises a baffle extending linearly outward from the surface of the tail boom 3. This baffle ensures eddies on the outflow side, which cause the desired flow deceleration of the main rotor exhaust wind (shown by arrow lines). Otherwise, this embodiment corresponds to the embodiment described above.

A further embodiment is illustrated in FIG. 4, in which spoilers 7"a and 7"b are provided, which each extend radially outward from the surface of the tail boom 3 in a first area, to subsequently run in the direction of the main rotor exhaust wind. The spoilers 7"a and 7"b are implemented from curved sheet-metal and are fastened on the tubular tail boom 3 by screws or rivets.

Furthermore, reinforcement profiles 8 (for example) running externally over the tail boom 3 are provided with partial covers 9a and 9b here, to provide the tail boom 3 with a suitable flow profile in combination with the means according to the invention for the aerodynamic support of the torque equalization.

The invention is not restricted to the embodiments described above. Rather, alterations thereof are also conceivable, which are also included by the protective scope of the following claims. Thus, for example, it is also possible to provide the tail boom 3 as tubular or oval having an unbroken surface in such a way that it allows the direct attachment of the means according to the object of the invention for the support of the torque equalization. Additional aerodynamic covers are primarily used for retrofitting older models.

LIST OF REFERENCE NUMERALS 1 airframe
2 main rotor
3 tail boom
4 tail rotor
5 auxiliary wing
6 fastening strut
7 spoiler
8 reinforcement profile
9 cover

The invention claimed is:
1. A helicopter comprising: at least one main rotor with blades situated on an airframe on which a tail rotor is addi- tionally attached spaced apart from the airframe via a tail boom for torque equalization, the tail boom having an outer surface with a facing side that faces the main rotor blades when advancing towards the tail boom, an opposing side laterally opposed to the facing side, and a proximal portion interposed between the facing side and the opposing side and proximal to the main rotor, the outer surface having an impact zone on the facing side where an exhaust gas jet produced from the blades of the main rotor impacts the outer surface, the tail boom being provided with equalization means for the aerodynamic support of the torque equalization, said equalization means laterally attached below the impact zone on the facing side of the tail boom and spaced apart from the facing side, said equalization means having at least one auxiliary wing with an aerodynamic wing profile situated spaced apart from the surface of the tail boom via fastening struts, the at least one auxiliary wing extending laterally along the tail boom for flow acceleration of the exhaust gas jet of the main rotor passing by.

2. The helicopter according to claim 1, wherein the equalization means has precisely two auxiliary wings situated on the tail boom, one of the wings being an upstream auxiliary wing, and the other of the wings being a downstream auxiliary wing, the upstream auxiliary wing being proximal to the main rotor so as to accelerate the exhaust gas jet of the main rotor in a first stage, the downstream auxiliary wing accelerates further in a second stage.

3. The helicopter according to claim 1, wherein the fastening struts are configured to cause a flow acceleration of the exhaust gas jet passing between the auxiliary wing and the outer surface of the tail boom.

4. The helicopter according to claim 1, wherein the tail boom is implemented as tubular and has an ovate main cross-section and the equalization means extend along the length of the tail boom.

5. The helicopter according to claim 1, further comprising at least one spoiler, extending along the tail boom on the opposing side, for flow deceleration of the exhaust gas jet of the main rotor passing by the opposing side.

6. The helicopter according to claim 5, wherein the least one spoiler has a wedge-shaped cross-section and is attached directly on the outer surface of the tail boom.

7. The helicopter according to claim 5, wherein the least one spoiler is implemented as a baffle extending linearly outward from the opposed side of the tail boom.

8. The helicopter according to claim 5, wherein the least one spoiler is implemented as a baffle extending outward from the opposed side of the tail boom and then bent in towards the main rotor.

9. The helicopter according to claim 1, further comprising reinforcement profiles running externally over the tail boom and provided with aerodynamic covers to provide the tail boom with an overall aerodynamic profile to support the torque equalization.

10. The helicopter according to claim 1 wherein the at least one auxiliary wing includes a first and a second auxiliary wing, the auxiliary wings situated on the tail boom lying one behind another in a flow direction, of which the first auxiliary wing proximal to the main rotor accelerates the passing exhaust air of the main rotor in a first stage, which the downstream second auxiliary wing accelerates further in a second stage.

11. The helicopter according to claim 1, characterized in that reinforcement profiles running externally over the tail boom are provided with aerodynamic covers to provide the tail boom with an overall aerodynamic profile to support the torque equalization.

12. The helicopter according to claim 1 wherein the at least one auxiliary wing has a flank side in front of the facing side of the tail boom.

\* \* \* \* \*